June 13, 1944. F. C. WARNE 2,351,168
HYDRAULIC CONTROL MEANS FOR TRACTOR-DRAWN DISK HARROWS
Filed Dec. 18, 1940 5 Sheets-Sheet 1

INVENTOR.
F. C. Warne
BY
ATTORNEYS

June 13, 1944. F. C. WARNE 2,351,168
HYDRAULIC CONTROL MEANS FOR TRACTOR-DRAWN DISK HARROWS
Filed Dec. 18, 1940 5 Sheets-Sheet 4

INVENTOR.
F. C. Warne
ATTORNEY.

June 13, 1944.  F. C. WARNE  2,351,168
HYDRAULIC CONTROL MEANS FOR TRACTOR-DRAWN DISK HARROWS
Filed Dec. 18, 1940  5 Sheets-Sheet 5

INVENTOR.
F. C. Warne
BY
ATTORNEYS

Patented June 13, 1944

2,351,168

UNITED STATES PATENT OFFICE 2,351,168

HYDRAULIC CONTROL MEANS FOR TRACTOR-DRAWN DISK HARROWS

Frederick C. Warne, Mansfield, Ohio, assignor to Farm Tools, Inc., Mansfield, Ohio, a corporation Application December 18, 1940, Serial No. 370,656

7 Claims. (Cl. 55—83)

This invention in its broadest sense relates to the control of tractor drawn multiple gang disk harrows and in general it is my object to provide unique apparatus which is operative to effect power controlled shifting of the gangs from an angled position to a straight or closed position, and vice versa; such apparatus being constructed and mounted so that such shifting of the gangs may be accomplished without necessity of stopping the tractor and while it is in forward motion.

Another broad object of the invention is to embody, in the combination of a tractor and a trailing multiple gang disk harrow, power actuated apparatus connected between the tractor and harrow, and operative under the control of the tractor operator, to positively and forcefully draw the gangs from angled position to a straight position, or to readily allow them to shift to angled position.

In its more specific aspects, the invention relates to a tractor drawn tandem disk harrow adapted for connection with a tractor having hydraulically actuated rocker arms, one object of the present invention being to provide unique connections between the tandem disk harrow, tractor and such rocker arms, whereby to render it possible to effect shifting of the harrow gangs from an angled to a straight position and from a straight to an angled position while the tractor is in forward motion. One example of such hydraulically operated rocker arms is to be found in the disclosures of the United States patents to H. G. Ferguson Nos. 2,118,180 and 2,118,181.

Other specific objects of the invention are:

(a) To embody in the combination with a tractor having such hydraulically actuated rocker arms, a trailing tandem disk harrow, with connections between said tractor, tractor rocker arms and harrow which are operative under the control of the tractor operator to shift the disk gangs to an operative or inoperative position while the tractor is in forward motion;

(b) To provide a swinging drawbar, the function of which is to draw the disk harrow and at the same time to facilitate the turning of the tractor under draft;

(c) To provide connections between the tractor and disk harrow to function in such a manner that when the harrow gangs are angled or straightened, the main draft frame of the harrow retains its relative longitudinal relation with respect to the tractor;

(d) To provide draft connections having two vertical pivots to insure and allow free lateral movements of the harrow with respect to the tractor;

(e) To provide a hydraulically operated disk harrow gang control device, said device functioning in such a manner that when the angle of the gangs does not change relative to the draft frame when the harrow is swung laterally by the turning of the tractor;

(f) To so construct the harrow for its connection with the tractor as to guard against excessive strain on the hydraulic device. To this end, the construction is such that when the gangs are being straightened, they turn only on their own pivots. The main draft frame then carries the draft load on the drawbar, and the draft frame is not drawn forward by the connections connected with the hydraulic shifting device. In other words, the invention contemplates that the direct pull on the harrow shall be through the main draft connections only, and not through the shifting elements which are connected with the hydraulically operated rocker arms on the tractor.

(g) To provide a lock to hold the gangs straight and relieve all strain on the hydraulic mechanism when the harrow is to be transported.

(h) To provide means to selectively limit the degree of angle of the gangs.

A still further object of the invention is to produce a simple combination of elements which will be exceedingly effective for the purpose for which it is designed.

The foregoing and other minor objects are accomplished by means of such structure and relative arrangement of parts as will fully appear by a perusal of the following specification and claims.

In the drawings similar characters of reference indicate corresponding parts in the several views.

Figure 1:
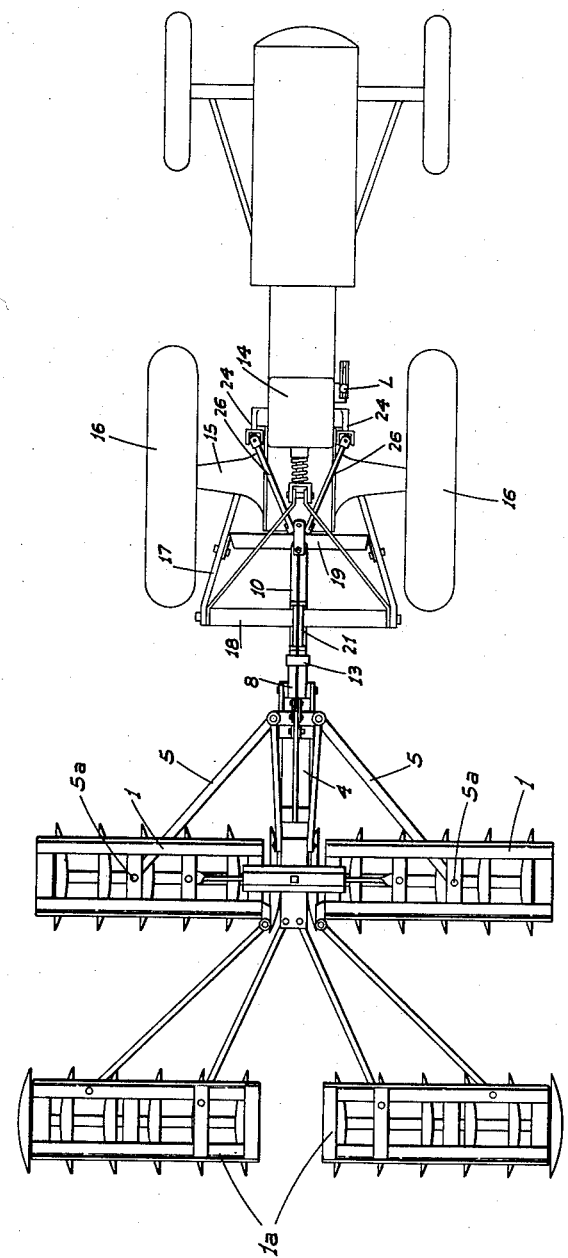
Figure 1 is a plan of a tandem tractor disk unit attached to a tractor, the gangs being in their parallel unangled position.
Figure 2:
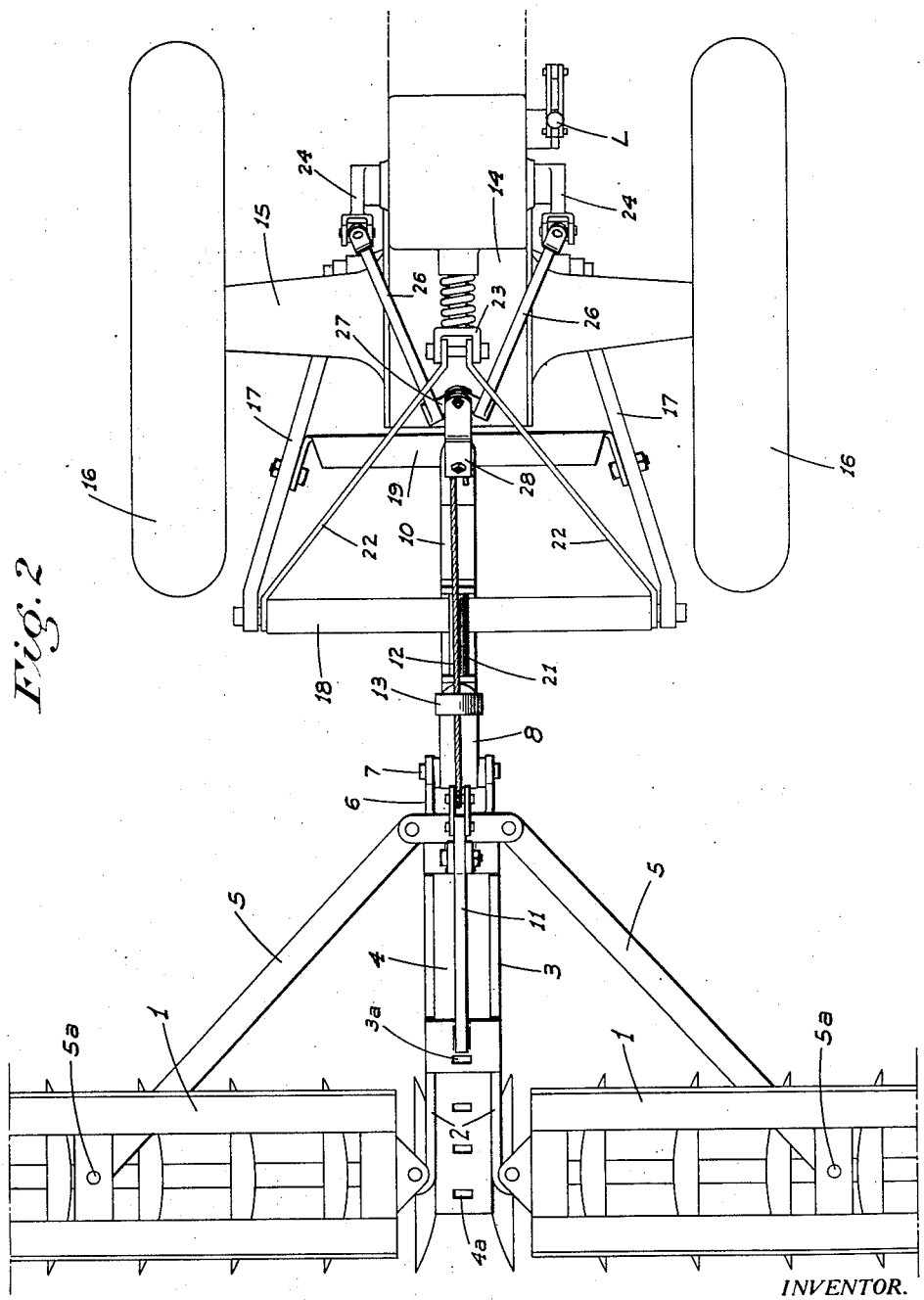
Figure 2 is a plan view showing only the rear end of the tractor and the front end of a fragmentary portion of the front harrow to show more clearly the connections between the harrow and tractor which are the essence of my invention. In this view, the gangs are also shown in straight, unangled position.

Referring now more particularly to the characters of reference on the drawings, the harrow as illustrated includes two pair of disk gang frames 1 and 1a, the gangs being arranged in end to end relation as usual.

Pivoted on the frames 1 at their adjacent ends are the rear end elements 2 of a slide 3 which embraces and is slidable on a draft bar 4. Links 5 are pivotally connected to the draft bar 4 adjacent its forward end, said links diverging thence to pivotal connections with the gang frames intermediate their ends, as at 5a.

An upstanding bracket unit 6 is fixed on bar 4 just ahead of these links 5 and is connected by a horizontal pivot 7 with a clevis 8. This clevis is connected by a vertical pivot pin 9 with the rear end of a draft bar 10.

A bracket comprising arms 11 projects upwardly from the slide 3 to a level above that of bracket unit 6 and attached to and projecting forwardly from bracket 11 is a cable 12. This cable projects through a guide thimble or eyelet 13 turnably mounted concentric and in connection with pin 9.

The above comprises the harrow parts employed in carrying out the invention.

The tractor to which the cable and draft bar are connected, and preferably of the type shown in the aforementioned patents, includes a mechanism housing 14 at its rear end which supports the axle housing 15 of the rear wheels 16. Rearwardly diverging draft arms 17 are pivoted at their forward end on opposite sides of housing 14 below and just ahead of housing 15. At their rear end, the arms are connected by a cross bar 18. I provide another similar cross bar 19 connected to said arms 18 just behind housing 14. A draft bar 10 extends under bar 18 and at its forward end is pivoted on bar 19 centrally of its ends as at 20. To prevent sagging of bar 10, a longitudinally extending roller 21 is mounted thereon in position to ride bar 18 while allowing of horizontal swivel movement of said draft bar 10 about its pivot 20.

To set the arms 17 against movement from any desired rear-end level, tension braces 22 are connected to the arms at their rear end and project thence upwardly in converging relation to a common connection with a yoke 23 mounted on top of housing 14.

Mounted on top of housing 14 at the sides thereof and ahead of yoke 23 are transversely spaced rocker arms 24 adapted to swing in vertical planes, the rotation of the transverse mounting and operating shaft 25 of the arms being hydraulically controlled in the manner shown in said aforementioned patents, of which no detailed description is given here.

The arms 24 project rearwardly from their shaft and swivelly connected to these arms at their outer rear ends are links 26. These links depend in converging relation under the braces 22 to a common swivel connection element 27 on a clevis 28 to which it is swivelly connected, and to which clevis 28 the forward end of the cable 12 is attached.

Figure 3:
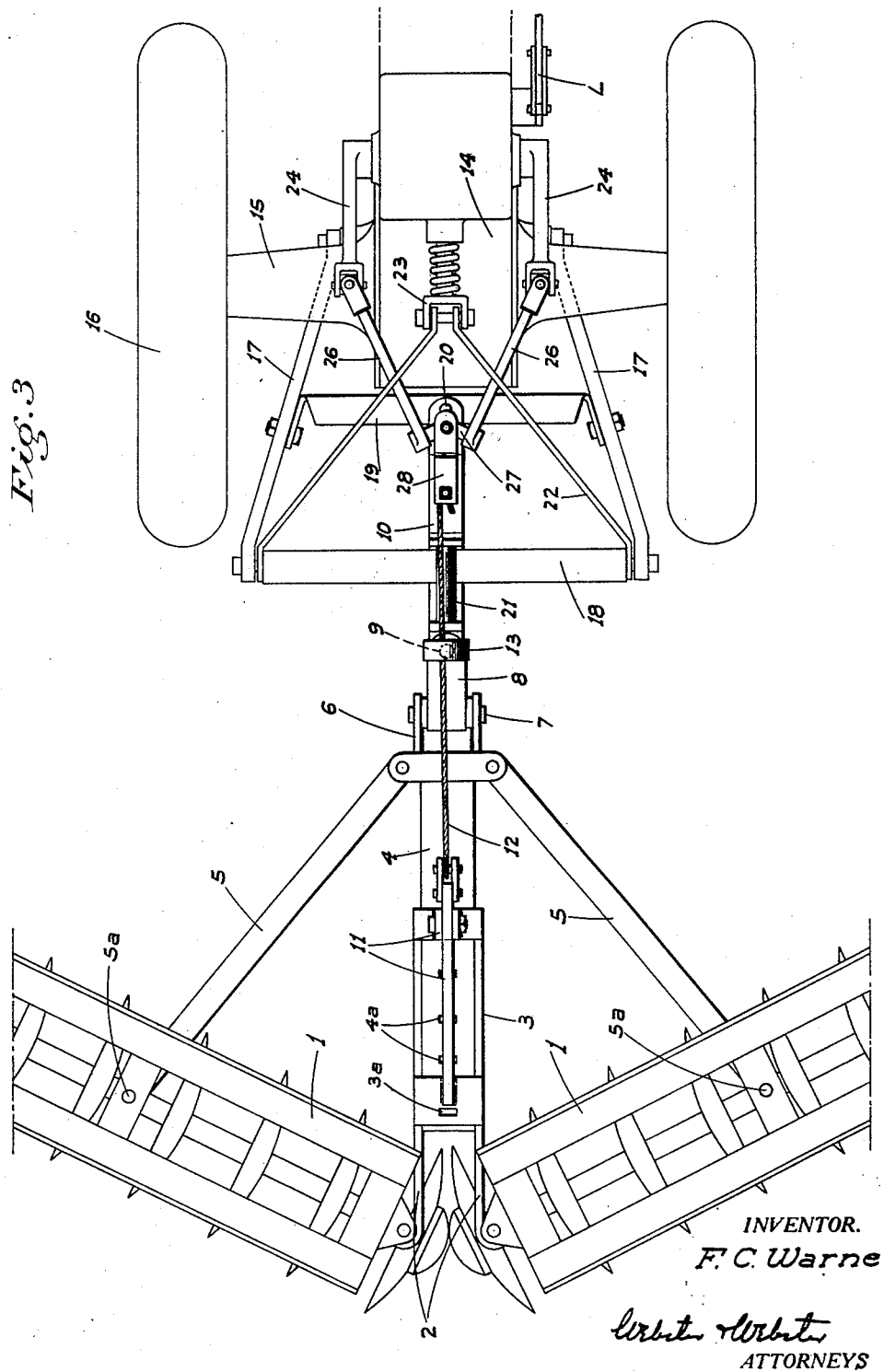
Figure 3 is a similar view to that of Fig. 2, but showing the gangs angled.

The parts above described are arranged so that when power actuated rocker arms 24 are in their lowest and rearmost position, clevis 28 is above and close to draft bar pivot 10, and the cable then runs relatively straight from end to end. Also, when in this position, the slide 3 is relatively retracted on bar 4 and the gangs are angled as shown in Fig. 3.

It is to be noted that when in operation, the direct draft or pull on the harrow is from the crossbar 19, the draft bars 10 and 4, the link bars 5, and then directly to the draft frames 1 and 1a. When the rocker arms 24 are actuated to pull on the cable 12, the gangs turn on their own pivots 5a while the pulling draft of the tractor continues through the elements just enumerated, and thus there is no excessive strain on the hydraulic mechanism of the tractor as the same is operated to straighten the gangs.

It will be apparent that through the instrumentalities described, the shifting of the gangs into angle and the pulling of the same out of angle can be readily accomplished while the tractor is in forward motion and without stopping the same.

When it is desired to straighten the gangs, it is only necessary to put the hydraulic power means into action through the medium of the lever L to cause the rocker arm 24 to be swung upwardly. This of course pulls links 26 and cable clevis 28 up, the cable bending at thimble 13. With this movement, the cable does not extend in a straight line with the links, since the latter are engaged intermediate their ends by braces 22 against which they slide.

Figure 4:
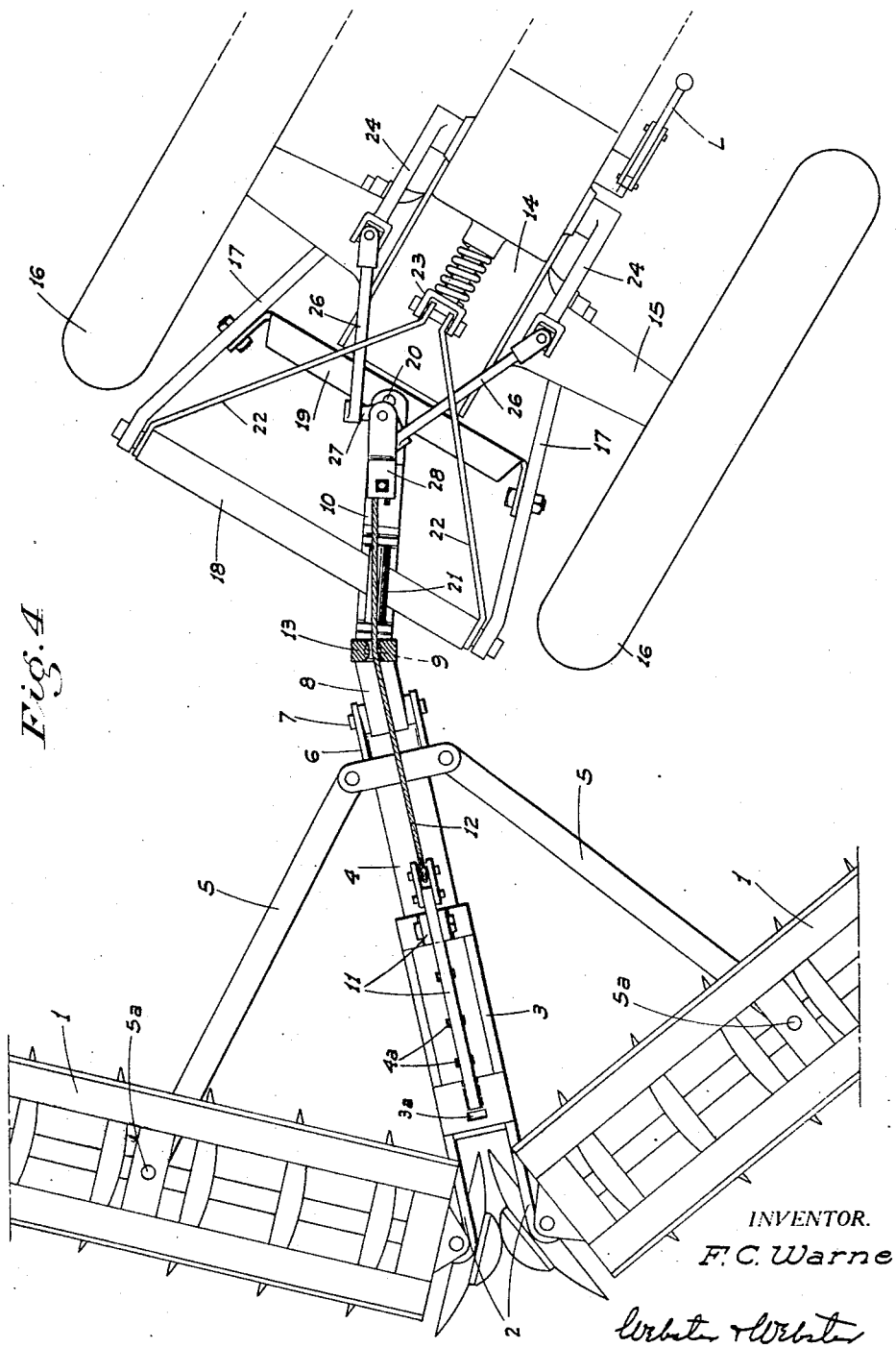
Figure 4 is a similar view showing the gangs angled and with the tractor making a turn.
Figure 5:
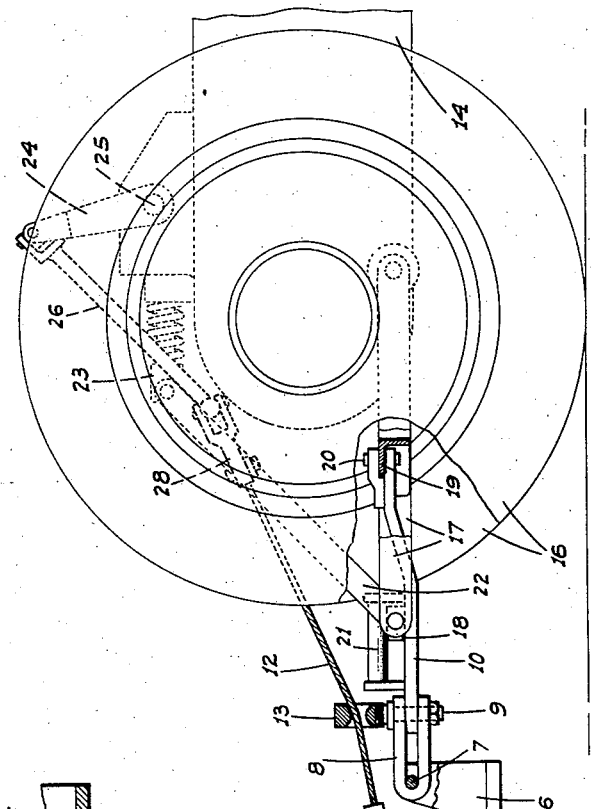
Figure 5 is a fragmentary side elevation showing the connecting and control structure in position they assume when the gangs are straightened.
Figure 6:
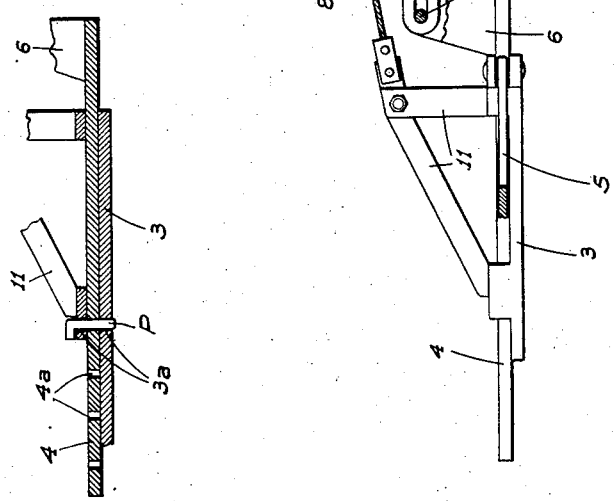
Figure 6 is a fragmentary longitudinal section of the draft bar and slide showing the two locked against movement.

The harrow may swing in a vertical plane relative to the tractor due to the pivot pin 7, while it may also swing laterally relative to the tractor, independently of any swinging of draft bar 10, by reason of the pivot pin 9, as shown in Fig. 4. Since the cable guide thimble 13 is positioned at pin 9, the harrow may thus swing relative to the tractor without any tensioning of the cable so that a turn may be made while maintaining the gangs fully angled if desired.

The draft bar 4 is provided with a plurality of spaced slots 4a and the slide 3 has a slot 3a. A pin P may be selectively put in any one of the slots 4a to limit the backward movement of the slide 3 and thus limit the degree of angle to which the gangs are permitted to move. When the gangs are straight, the pin P may be inserted through registering slots 3a and 4a and lock the elements 3 and 4 together so that all strain on the hydraulic mechanism may be relieved when transporting the harrow.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, what is claimed as new and useful and desired to secure by Letters Patent is:

1. In a disk harrow and tractor combination, said harrow including gang frames, a draft unit projecting forwardly from and swivelly connected to the gang frames at certain points, said unit including separate front and rear sections and a vertical pivot connecting the sections; and another draft unit swivelly connected to said frames at other points and including a portion slidable on the rear section of the first unit whereby relative longitudinal movement of said units will effect relative angling and straightening of the frames, a pivot connection between the front section and the tractor, the latter having a power actuated movable member thereon, a cable operatively connected to said member and extending thence to said other draft unit, and guide means for said cable mounted in vertical alinement with said pivot connection.

2. A structure as in claim 1, in which the rear section of said first named draft unit includes front and rear members, the front member comprising a clevis at its forward end in which said pivot connection is mounted, and a horizontal pivot pin connecting the clevis and the rear member.

3. In a disk harrow and tractor combination, the tractor having rearwardly extending transversely spaced arms held in a fixed position and a crossbar connecting the arms at their rear end; another crossbar connecting the arms ahead of the first named bar, a draft unit extending forwardly from the harrow under the first named crossbar, a vertical pivot connection between said unit and the second named crossbar, and a roller mounted on the unit with its axis radial with said pivot and riding on the first named crossbar.

4. In a disk harrow and tractor combination, an articulated drawbar unit connecting the harrow and tractor and including a vertical pivot, a member on the unit movable lengthwise thereof to effect a straightening of the harrow from an angled position with forward movement of the member, a cable connected to said member and extending thence forwardly, a guide thimble for the cable mounted on the unit above and substantially in vertical alinement with the pivot; the tractor having a movable power actuated unit thereon to which the cable ahead of the thimble is connected and disposed when actuated to exert a forward and upward pull on the cable.

5. In a disk harrow and tractor assembly the combination therewith of a draw bar unit connected with the harrow and tractor and having a vertical pivotal connection with said tractor, said draw bar unit including a member movable lengthwise of the harrow to effect the straightening of the harrow from an angled position with forward movement of the member, a cable connected to and projecting forwardly from said member, guide means for said cable on the unit adjacent the tractor, said tractor having power rotated transversely spaced rocker arms pivoted in common above the draw bar unit toward the rear end of the tractor and projecting rearwardly from their pivotal axis, links connected to and depending from the rear ends of the arms, and means connecting the lower ends of the links to the forward end of the cable at a point lying substantially in vertical alinement with the pivotal connection between the draw bar unit and the tractor when the arms are lowered and the harrow is in its angled position.

6. In a disk harrow and tractor combination, a draft unit extending forwardly from the harrow and having a vertical pivotal connection with said tractor, a cross bar mounted on said tractor in rearwardly spaced relation to the point of said pivotal connection, said cross bar and said draft unit extending across each other in a substantially perpendicular direction when the harrow and tractor are in longitudinal alinement, and means for supporting said draft unit on said cross bar for relative swinging movement longitudinally of said cross bar.

7. In a disk harrow and tractor combination, a draft unit extending forwardly from the harrow and having a vertical pivotal connection with said tractor, a cross bar mounted on said tractor in rearwardly spaced relation to the point of said pivotal connection, said cross bar and said draft unit extending across each other in a substantially perpendicular direction when the harrow and tractor are in longitudinal alinement, and means for supporting said draft unit on said cross bar for relative swinging movement longitudinally of said cross bar, said draft unit including horizontal and vertical pivotal connections located rearwardly of said cross bar.

FREDERICK C. WARNE.